United States Patent [19]

Price et al.

[11] 3,908,231

[45] Sept. 30, 1975

[54] FILLET BOARD

[76] Inventors: James A. Price, 1401 Crestwood; Vol W. Sharp, 1663 Old Wire Rd., both of Fayetteville, Ark. 72701

[22] Filed: June 11, 1974

[21] Appl. No.: 478,376

[52] U.S. Cl. .................. 17/70; 269/100; 269/309
[51] Int. Cl.² ...................................... A22C 25/06
[58] Field of Search ............. 17/70; 108/12, 97; 248/201, 223, 235; 269/95, 99, 100, 101, 289, 309

[56] References Cited
UNITED STATES PATENTS

| | | | |
|---|---|---|---|
| 2,607,070 | 8/1952 | Wertz | 17/70 |
| 3,177,523 | 4/1965 | Andersen | 17/70 |
| 3,785,008 | 1/1974 | Parker | 17/70 |

*Primary Examiner*—Roy Lake
*Assistant Examiner*—Mark S. Bicks
*Attorney, Agent, or Firm*—Stewart and Kolasch, Ltd.

[57] ABSTRACT

A fillet board comprising a substantially flat board having an upper and lower surface, the lower surface containing a pair of U-shaped female brackets, said brackets being spaced apart from each other and attached to said board along a hypothetical straight line running parallel to one edge of said board.

3 Claims, 5 Drawing Figures

FILLET BOARD

BACKGROUND AND SUMMARY OF THE INVENTION

The present invention relates to a fillet board which can be used for filleting fish. More particularly, the present invention is directed to a fillet board which is provided with brackets which enables it to be firmly attached to the gunnel of a boat when in use.

Fillet boards used for filleting fish while still in the boat are well known and in wide use. However, the fillet boards presently being used are not attached to any portion of the boat and accordingly, the instability of the fillet board during the filleting operation adversely affects the efficiency of said operation. Furthermore, the filleting operation is presently being conducted somewhere inside the boat wherever the fillet board is located and accordingly, if it is desired to dump the undesirable portions of the fish, that is, for example, the head and tail portions, back into the water, it is necessary that said portions be collected in a container and then dumped into the water when the container is full.

Because of the problems associated with the present day fillet boards, the fisherman generally waits until he reaches land before he fillets his catch. However, it can be readily seen that a fish fillet board which can be utilized to enable the fisherman to fillet his catch while he is still in the boat would be a tremendous asset to the fisherman, particularly the commercial fisherman who is always interested in streamlining the overall fishing operation.

Accordingly, an object of the present invention is to provide a fillet board which eliminates all of the problems associated with the prior art fillet boards presently in existence.

Another object of the present invention is to provide a fillet board which can be firmly attached to the gunnel of the boat, that is, the upper edge of the side of the boat, thereby enabling the fisherman to fillet his catch while standing in the boat.

A further object of the present invention is to provide a removable fillet board which contains a pair of brackets so that by rotating said board 180°, the edge of the fillet board can extend either over the water or into the boat depending upon whether or not the unusable portions of the fish are to be collected in the boat or discharged into the water.

A still further object of the present invention is to provide a removable fillet board which can also function as a portable table.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Pursuant to the present invention, a rectangularly shaped fillet board is provided with a pair of brackets which are attached to the bottom flat surface of the said board near the edge of the longest side of said rectangularly shaped board. Thus, for example, each of the brackets is attached to the bottom of the fillet board along a straight line with respect to each other and near the respective short sides of the board and near the edge of one long side of the board. To work in conjunction with the fillet board, the gunnel of the boat, that is, the upper edge of the side of the boat is provided with a pair of male U-shaped brackets which are spaced apart from each other on the gunnel the same distance that the female brackets are spaced apart on the bottom of the fillet board. Each of the U-shaped brackets attached to the gunnel of the boat contain a pair of hook-shaped arms so that the female brackets attached to the bottom of the fillet board can be attached to the identical hook-shaped arm portions of each of said male brackets. Thus, by attaching the female brackets to identical hook-shaped arm portions of the male brackets, the fillet board will extend from the boat out over the surface of the water, whereas, if the fillet board is rotated 180° and hooked to the other pair of hook-shaped arm portions of the male brackets, the fillet board will extend into the boat. Thus, the fillet board of the present invention is not only removable, and thus portable, but can be removably installed so that it extends either into the boat or out of the boat depending upon the desire of the user. Thus, if the fillet board extends into the boat, the undesired portions of the filleted fish can be more readily scraped into the boat whereas, if the board extends out over the water, the undesired portions of the filleted fish can be more readily discharged into the water.

As stated above, each of the U-shaped male brackets attached to the gunnel of the boat is provided with two hooked-shaped arms. This bracket design is particularly effective in that when the fillet board is engaged with one of the hooked-shaped portions of the male bracket, the other hook-shaped portions of said bracket serves to support the board thereby providing additional stability to the fillet board in its operational position.

It is apparent that the size of the fish board can be varied to accommodate any desired arrangement and particularly, the fillet board of the present invention can advantageously be used as a portable table or for any other purposes where a securely attached flat surface is desired.

The fillet board of the present invention is also provided with a clamp at one end thereof which is provided for holding the fish between said clamp and the surface of the fillet board. The clamp is provided so that, if desired, a portion of the fish being filleted can be held securely to the fillet board to facilitate the filleting operation.

The fillet board of the present invention has been developed with the convenience of the fisherman in mind so that he will be able to fillet his catch while still in the boat rather than waiting until he reaches land or returns to his home.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

Figure 1:
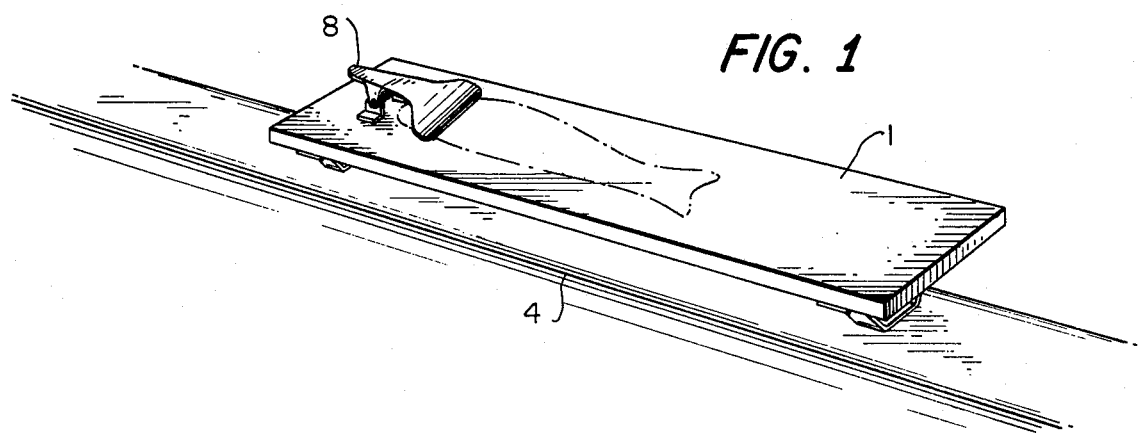
FIG. 1 shows a perspective view of the fillet board of the present invention.
Figure 2:
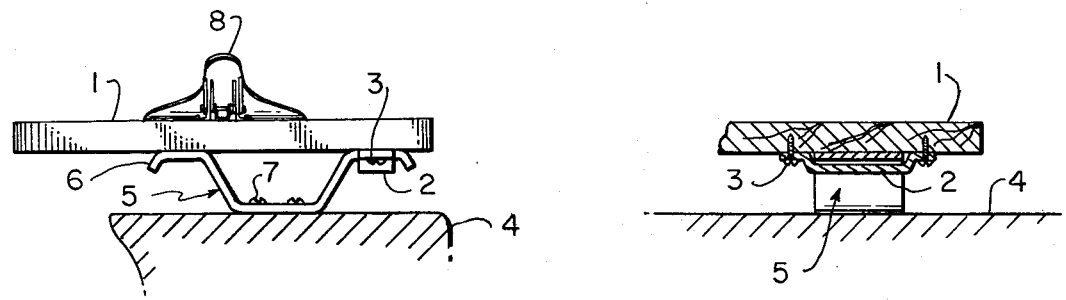
FIG. 2 shows the fillet board in a position where it extends out over the surface of the water.
Figure 4:
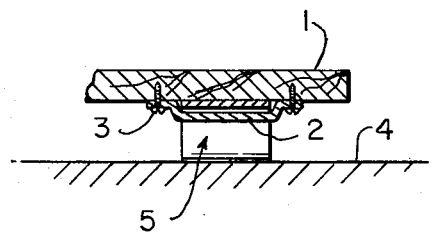
FIG. 4 shows an end view of FIG. 3 taken along the line 4—4.
Figure 3:
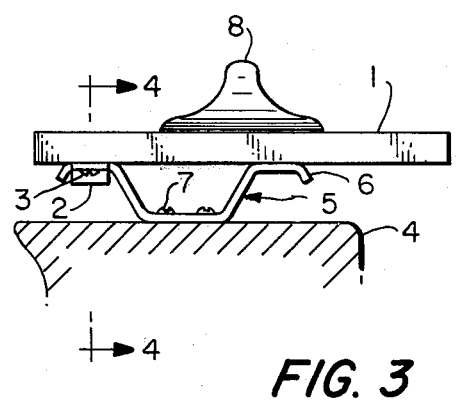
FIG. 3 shows the fillet board in a position where it extends into the boat.

Referring now to the drawings, wherein like reference numerals are used throughout the various views to indicate like elements, the fillet board of the present invention comprises a rectangularly shaped board 1 provided with a pair of female brackets 2 which are spaced apart from each other and are secured to the bottom surface of the fillet board near the edge of the longest side of said rectangularly shaped board. The female brackets 2 may be secured to the fillet board in any well known manner such as, for example, by the use of screws 3. The gunnel of the boat 4 is provided with a pair of male U-shaped brackets 5 which are spaced apart from each other the same distance that the female brackets are spaced apart from each other on the bottom of the fillet board. Screw means 3 are provided for mounting the male brackets to the boat. Each of the male brackets contain two hook-shaped arm portions 6 which are adapted to engage with the female brackets 2 attached to the bottom of the fillet board. Thus, if it is desired that the fillet board extend from the boat out over the surface of the water, the female brackets are attached to the hook-shaped arms as shown in FIG. 2. If it is desired that the fillet board extend into the boat, then the board is merely rotated 180° and the female brackets are now placed in engaging relationship with the opposite hook-shaped arms of said male brackets as shown in FIG. 3. Because the male brackets attached to the gunnel have identical arm portions, when one side of the brackets are in engaging relationship with the female brackets attached to the fillet board, the other arms of said brackets function to further support the board while it is in use.

Figure 5:
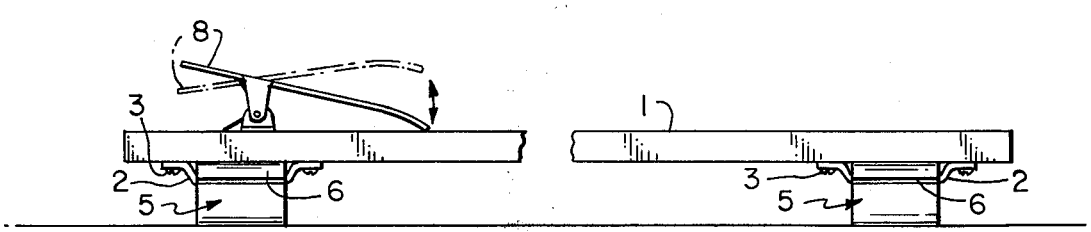
FIG. 5 shows the operation of the clamp provided in conjunction with the fillet board.

Advantageously, the fillet board of the present invention is provided with a spring-loaded clamp 8 which can be used to hold the fish in a fixed position during the filtering operation. FIG. 5 shows the overall operation of the clamp in conjunction with the fillet board. It is readily apparent that the fillet board of the present invention can be utilized for any purpose which would require a stable fixed surface, such as, for example, as a table or any other related purpose. Also, although the fillet board of the present invention advantageously has a rectangular shape, it is apparent that it can be of any desired shape, for example, square, round, etc. as long as the location of the male brackets in the gunnel coincide with the location of the female brackets on the fillet board. Similarly, the female brackets may be provided at any location on the fillet board although the position as shown in the drawings is particularly desirable for the reasons previously stated.

The invention being thus described, it will be obvious that the same may be varied in many ways. Such variations are not to be regarded as a departure from the spirit and scope of the invention, and all such modifications are intended to be included within the scope of the following claims.

I claim:

1. A fillet board having substantially flat upper and lower surfaces, the lower surface containing a pair of U-shaped female brackets, said brackets being spaced apart from each other and offset from the medial axis of the board, and a pair of U-shaped male brackets which are adapted to be mounted on the gunnel of a boat and engage said female brackets, each of said U-shaped male brackets provided with two hook-shaped arms, one of said arms being adapted to engage one of said female brackets while the other arm acts as a support for the fillet board, either arm of each of the male brackets being capable of being inserted into the female bracket with the other arm acting as a support for the fillet board, said fillet board extending either external or internal to the gunnel of the boat depending upon with which arm of the male bracket the female bracket is engaged.

2. The fillet board of claim 1, wherein the board has a rectangular shape and said U-shaped female brackets are attached to said board a short distance from the edge of the longest side of said board.

3. The fillet board of claim 1, wherein the upper surface thereof is provided with a clamp means.

* * * * *